(12) United States Patent
Kanda

(10) Patent No.: US 11,965,811 B2
(45) Date of Patent: Apr. 23, 2024

(54) PARTICLE SORTING APPARATUS AND METHOD OF ALIGNING FLOW CELL

(71) Applicant: Allied Flow Inc., Nishinomiya (JP)

(72) Inventor: Masahiko Kanda, Nishinomiya (JP)

(73) Assignee: Allied Flow Inc., Nishinomiya (JP)

( * ) Notice: Subject to any disclaimer, the term of this patent is extended or adjusted under 35 U.S.C. 154(b) by 301 days.

(21) Appl. No.: 17/595,718

(22) PCT Filed: Jul. 16, 2019

(86) PCT No.: PCT/JP2019/027937
§ 371 (c)(1),
(2) Date: Nov. 23, 2021

(87) PCT Pub. No.: WO2021/009849
PCT Pub. Date: Jan. 21, 2021

(65) Prior Publication Data
US 2022/0260478 A1 Aug. 18, 2022

(51) Int. Cl.
*G01N 15/14* (2006.01)
*G01N 15/149* (2024.01)

(52) U.S. Cl.
CPC ........... *G01N 15/14* (2013.01); *G01N 15/149* (2024.01)

(58) Field of Classification Search
CPC ......... G01N 2015/149; G01N 15/1425; G01N 15/1427; G01N 15/14; B07C 5/3422; B07C 5/342; B03C 5/00; B03C 5/02; B03C 9/00; B03C 11/00; G05B 19/27; G06N 7/005
USPC .................................. 356/335–343; 209/577
See application file for complete search history.

(56) References Cited

U.S. PATENT DOCUMENTS

| | | | | |
|---|---|---|---|---|
| 4,732,479 A | * | 3/1988 | Tanaka | G01N 15/1434 356/336 |
| 10,466,158 B2 | * | 11/2019 | Otsuka | G01N 15/1425 |
| 2013/0256136 A1 | * | 10/2013 | Muraki | B03C 7/003 204/555 |
| 2015/0057787 A1 | | 2/2015 | Muraki et al. | |
| 2015/0068957 A1 | | 3/2015 | Otsuka et al. | |
| 2016/0370280 A1 | * | 12/2016 | Yamamoto | G01N 15/1434 |
| 2018/0313740 A1 | * | 11/2018 | Otsuka | G01N 15/1425 |

(Continued)

FOREIGN PATENT DOCUMENTS

| | | |
|---|---|---|
| JP | 2011-252871 A | 12/2011 |
| JP | 2014-063109 A | 4/2014 |

(Continued)

OTHER PUBLICATIONS

International Search Report for PCT/JP2019/027937, dated Oct. 15, 2019.

*Primary Examiner* — Hoa Q Pham
(74) *Attorney, Agent, or Firm* — Sughrue Mion, PLLC

(57) ABSTRACT

A particle sorting apparatus includes: a flow cell including a flow channel; an imaging element; and a controller. The controller performs a coarse adjustment onto a position of the flow cell based on an image regarding a flow axis of the flow channel and obtained by the imaging element, while continuously moving the flow cell at a first speed. The controller performs a final adjustment onto the position of the flow cell to allow the first intensity of the first light emitted from the light emitting object flowing in the flow channel to be maximum while moving the flow cell at a second speed that is lower than the first speed.

6 Claims, 9 Drawing Sheets

(56) References Cited

U.S. PATENT DOCUMENTS

2019/0143330 A1   5/2019   Kanda
2020/0324291 A1   10/2020  Kanda

FOREIGN PATENT DOCUMENTS

JP    2017-201278  A    11/2017
WO    2013/145836  A1   10/2013
WO    2014/115409  A1    7/2014

* cited by examiner

PARTICLE SORTING APPARATUS AND METHOD OF ALIGNING FLOW CELL

CROSS REFERENCE TO RELATED APPLICATIONS

This application is a National Stage of International Application No. PCT/JP2019/027937 filed Jul. 16, 2019.

TECHNICAL FIELD

The present invention relates to a particle sorting apparatus and a method of aligning a flow cell.

BACKGROUND ART

Due to progress in biotechnology, in various fields including medical science and biology, a demand has been increased for an apparatus that performs a process such as sorting or analysis on a multiplicity of cell particles, which are exemplary biological particles. As one example of such an apparatus, Japanese Patent Laying-Open No. 2017-201278 (PTL 1) discloses a cell sorter.

CITATION LIST

Patent Literature

PTL 1: Japanese Patent Laying-Open No. 2017-201278

SUMMARY OF INVENTION

Technical Problem

An object of the present invention is to provide a particle sorting apparatus and a method of aligning a flow cell, by each of which the flow cell can be aligned in a shorter period of time.

Solution to Problem

A particle sorting apparatus according to one aspect of the present invention includes: a flow cell including a flow channel; an imaging element; a light intensity detector; a moving mechanism; and a controller. The imaging element obtains an image regarding a flow axis of the flow channel. The light intensity detector detects an intensity of light emitted from a light emitting object included in a liquid flowing in the flow channel. The moving mechanism moves the flow cell. The controller controls the moving mechanism. The controller performs a coarse adjustment onto a position of the flow cell based on the image regarding the flow axis of the flow channel while controlling the moving mechanism to continuously move the flow cell at a first speed. The controller performs a final adjustment onto the position of the flow cell to allow a first intensity of first light emitted from the light emitting object to be maximum, while controlling the moving mechanism to move the flow cell at a second speed that is lower than the first speed, the first intensity of the first light being detected by the light intensity detector.

A method of aligning a flow cell according to one aspect of the present invention includes a coarse adjustment step and a final adjustment step. In the coarse adjustment step, a coarse adjustment is performed onto a position of the flow cell based on an image regarding a flow axis of a flow channel of the flow cell while continuously moving the flow cell at a first speed. In the final adjustment step, after the coarse adjustment step, a final adjustment is performed onto the position of the flow cell to allow a first intensity of first light emitted from a light emitting object included in a liquid flowing in the flow channel to be maximum, while moving the flow cell at a second speed that is lower than the first speed.

Advantageous Effects of Invention

According to the particle sorting apparatus and the method of aligning the flow cell in the present invention, the flow cell can be aligned in a shorter period of time.

DESCRIPTION OF EMBODIMENTS

Figure 1:
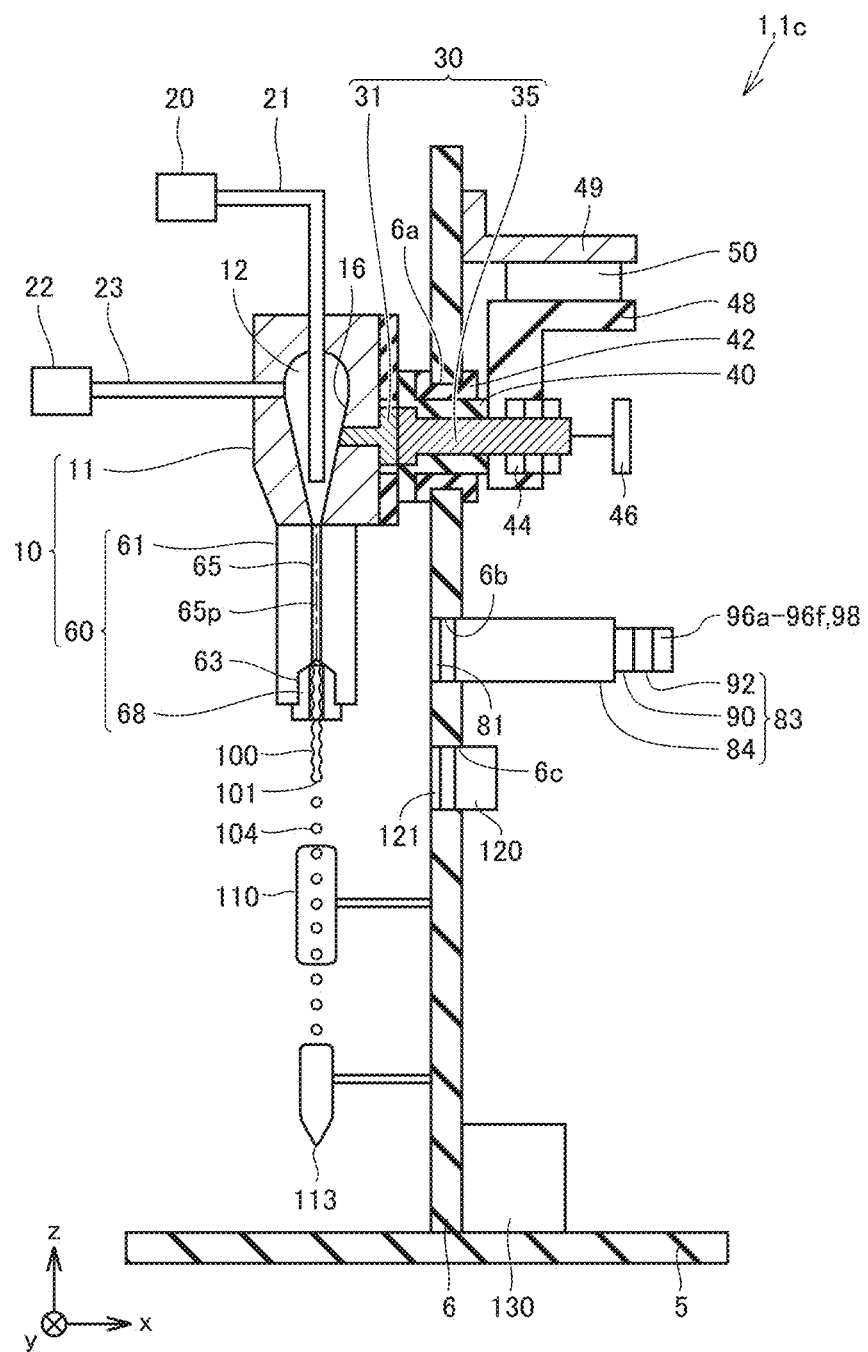
FIG. 1 is a schematic cross sectional view of a particle sorting apparatus according to each of first and third embodiments.

Hereinafter, embodiments of the present invention will be described. It should be noted that the same configurations are denoted by the same reference characters, and will not be described repeatedly.

First Embodiment

With reference to FIG. 1 to FIG. 5, the following describes a particle sorting apparatus 1 according to a first embodiment.

Particle sorting apparatus 1 mainly includes a flow chamber 10, a vibration electrode 30, a vibration element 44, a charge supply unit 46, a moving mechanism 50, a detection optical system 83, a light intensity detector 99, a sorting unit 110, a collection unit 113, an imaging element 120, a controller 130, a storage unit 140, a base 5, and a wall 6.

Wall 6 is fixed to base 5. Flow chamber 10, sorting unit 110, and collection unit 113 are disposed at one side relative to wall 6. Vibration element 44, moving mechanism 50, detection optical system 83, light intensity detector 99, imaging element 120, and controller 130 are disposed at the other side relative to wall 6.

Flow chamber 10 includes a chamber 11 and a flow cell 60.

A cavity 12 is provided inside chamber 11. A first conduit 21 connected to a first tank 20 is inserted in cavity 12 of chamber 11. When sorting particles 105 using particle sorting apparatus 1, a sample liquid including particles 105 is stored in first tank 20. Particles 105 are sample particles, such as biological particles (cells or chromosomes) labeled with fluorescent materials such as a fluorescent dye and a fluorescent antibody. In the case of aligning flow cell 60, each of particles 105 is a fluorescent bead (such as SPHERO (™) Rainbow Calibration Particles RCP-30-5), for example. A second conduit 23 connected to a second tank 22 is inserted in cavity 12 of chamber 11. Second tank 22 stores a sheath liquid.

The sheath liquid stored in second tank 22 is supplied to cavity 12 of chamber 11 through second conduit 23. The liquid stored in first tank 20 and including light emitting objects is supplied to cavity 12 of chamber 11 through first conduit 21. The light emitting objects are particles 105 such as sample particles or fluorescent beads, for example. The liquid including the light emitting objects is supplied into cavity 12 of chamber 11 filled with the sheath liquid. In cavity 12 of chamber 11, the liquid including the light emitting objects is enclosed with the sheath liquid, thereby forming a sheath flow.

Flow cell 60 is attached to chamber 11. Flow cell 60 may be detachably coupled to chamber 11. Flow cell 60 includes a flow cell body portion 61. Flow cell body portion 61 is composed of a material (for example, a transparent inorganic material such as quartz, or a transparent resin material) transparent to laser light 71, fluorescence 77, side-scattered light 77s, and forward-scattered light 77f (see FIG. 4). Fluorescence 77 and side-scattered light 77s are emitted from the light emitting objects (for example, particles 105 such as the sample particles or the fluorescent beads) irradiated with laser light 71.

A flow channel 65 is provided in flow cell body portion 61. A nozzle receiving portion 63 communicating with flow channel 65 is provided in flow cell body portion 61. Flow channel 65 communicates with cavity 12 of chamber 11. The sheath flow flows from cavity 12 to flow channel 65 of flow cell 60. In flow channel 65, particles 105 included in the sheath flow are arranged in one line along a flow axis (center axis) 65p of flow channel 65. Flow axis 65p of flow channel 65 extends in a first direction (z direction). Flow cell 60 includes a nozzle 68. A portion of nozzle 68 is received in nozzle receiving portion 63.

Figure 3:
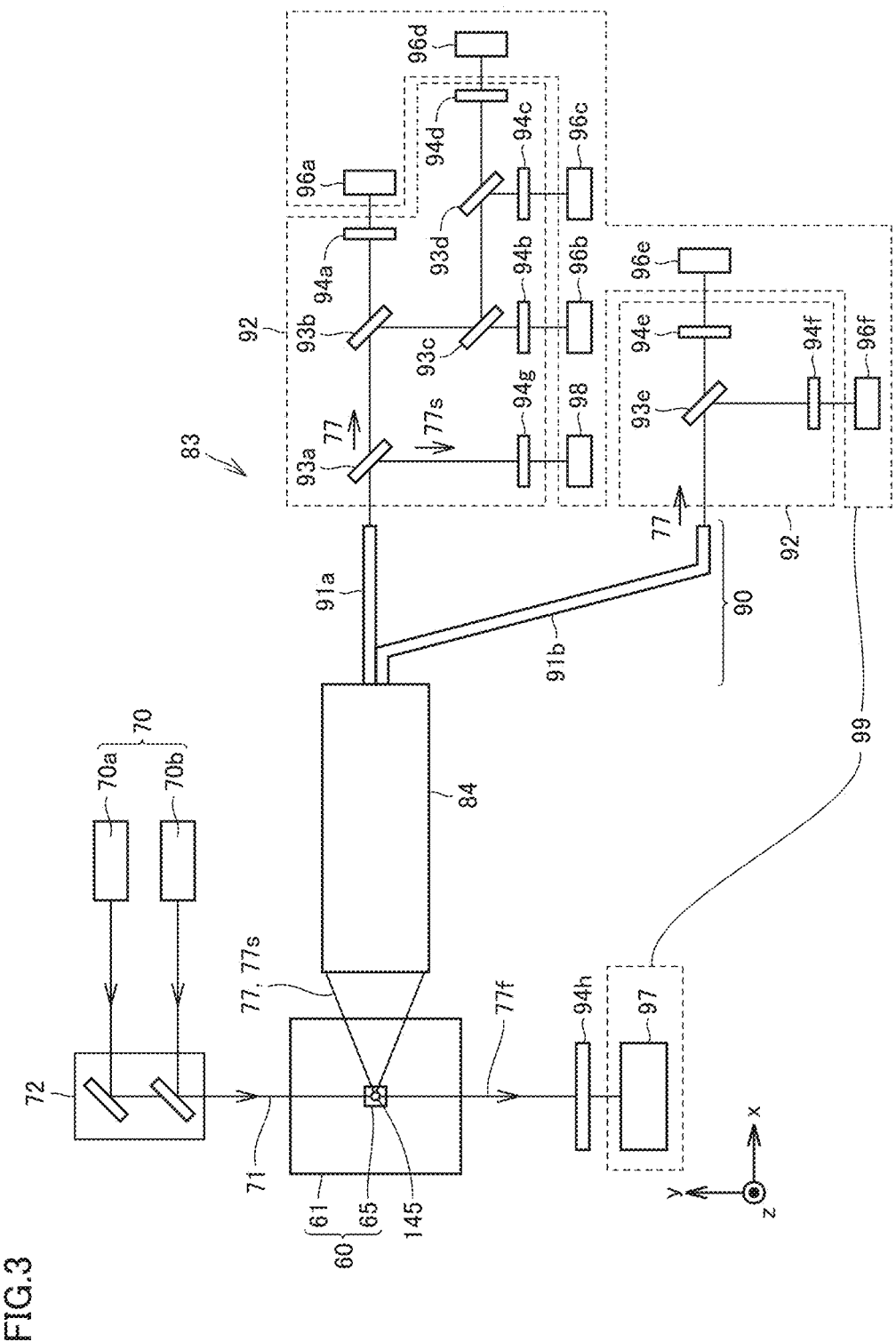
FIG. 3 is a schematic diagram showing an optical system included in the particle sorting apparatus according to each of the first and third embodiments.

As shown in FIG. 3, each of particles 105 arranged in one line within flow channel 65 is irradiated with laser light 71 from light source unit 70. Laser light 71 may include laser light having a plurality of wavelengths. Specifically, light source unit 70 includes lasers 70a, 70b. The wavelength of the laser light emitted by laser 70a and the wavelength of the laser light emitted by laser 70b are different from each other. Each of particles 105 flowing in flow channel 65 is irradiated with laser light 71 emitted from light source unit 70, via a light wavelength combining unit 72. Laser light 71 travels along a third direction (y direction) perpendicular to the first direction (z direction) and a second direction (x direction) and enters flow channel 65. Light wavelength combining unit 72 includes a dichroic mirror, for example. Fluorescence 77, forward-scattered light 77f, and side-scattered light 77s are emitted from particle 105. With laser light 71 including the light having the plurality of wavelengths, a plurality of pieces of identification information of each particle 105 can be obtained at one time. Particle 105 can be sorted efficiently.

As shown in FIG. 1, detection optical system 83 faces flow cell 60 (a side surface of flow cell body portion 61) with a transparent window member 81 being interposed therebetween. Transparent window member 81 is fitted in an opening 6b of wall 6. Fluorescence 77 and side-scattered light 77s enter detection optical system 83 through transparent window member 81. Detection optical system 83 guides fluorescence 77 and side-scattered light 77s to light intensity detector 99.

As shown in FIGS. 1 and 3, detection optical system 83 includes a detection side lens optical system 84, an optical fiber array 90, and a wavelength division unit 92. Detection side lens optical system 84 images fluorescence 77 and side-scattered light 77s on an incident surface of optical fiber array 90 with low chromatic aberration and low image aberration. Optical fiber array 90 is disposed between detection side lens optical system 84 and wavelength division unit 92. Optical fiber array 90 includes a plurality of optical fibers 91a, 91b. The plurality of optical fibers 91a, 91b are disposed to correspond to the plurality of lasers 70a, 70b, respectively. Optical fiber array 90 transmits fluorescence 77 and side-scattered light 77s to light intensity detector 99 (first light detectors 96a to 96f and a third light detector 98).

Wavelength division unit 92, which is disposed between optical fiber array 90 and light intensity detector 99 (specifically, first light detectors 96a to 96f and third light detector 98), divides fluorescence 77 and side-scattered light 77s. Wavelength division unit 92 includes dichroic mirrors 93a, 93b, 93c, 93d, 93e and wavelength filters 94a, 94b, 94c, 94d, 94e, 94f, 94g. Each of dichroic mirrors 93a to 93e reflects and permits passage of corresponding ones of beams of light in different wavelength regions. Each of wavelength filters 94a to 94f permits passage of a corresponding one of beams of light in different wavelength regions and blocks beams of light in the other wavelength regions. Wavelength filters 94a to 94f allow for improved detection precision for fluorescence 77 in first light detectors 96a to 96f Wavelength filter 94g permits passage of side-scattered light 77s and blocks fluorescence 77. Wavelength filter 94g allows for improved detection precision for side-scattered light 77s in third light detector 98.

Light intensity detector 99 detects an intensity of light emitted from a light emitting object included in the liquid flowing in flow channel 65. Specifically, light intensity detector 99 includes first light detectors 96a to 96f, second light detector 97, and third light detector 98. Each of first light detectors 96a to 96f measures an intensity of fluorescence 77 emitted from the light emitting object. Second light detector 97 measures an intensity of forward-scattered light 77f emitted from the light emitting object. Third light detector 98 measures an intensity of side-scattered light 77s emitted from the light emitting object. Each of first light detectors 96a to 96f, second light detector 97, and third light detector 98 is a photomultiplier tube (PMT) or a photodiode, for example. Identification information of particle 105 is obtained by controller 130 analyzing at least one of the intensity of fluorescence 77, the intensity of forward-scattered light 77f, or the intensity of side-scattered light 77s, each of which is detected by light intensity detector 99.

Wavelength filter 94h is disposed between flow cell 60 (flow cell body portion 61) and second light detector 97. Wavelength filter 94h permits passage of beams of light in a wavelength region including the wavelength of forward-scattered light 77f, and blocks beams of light in the other wavelength regions. Wavelength filter 94h allows for improved detection precision for forward-scattered light 77f in second light detector 97.

Figure 2:
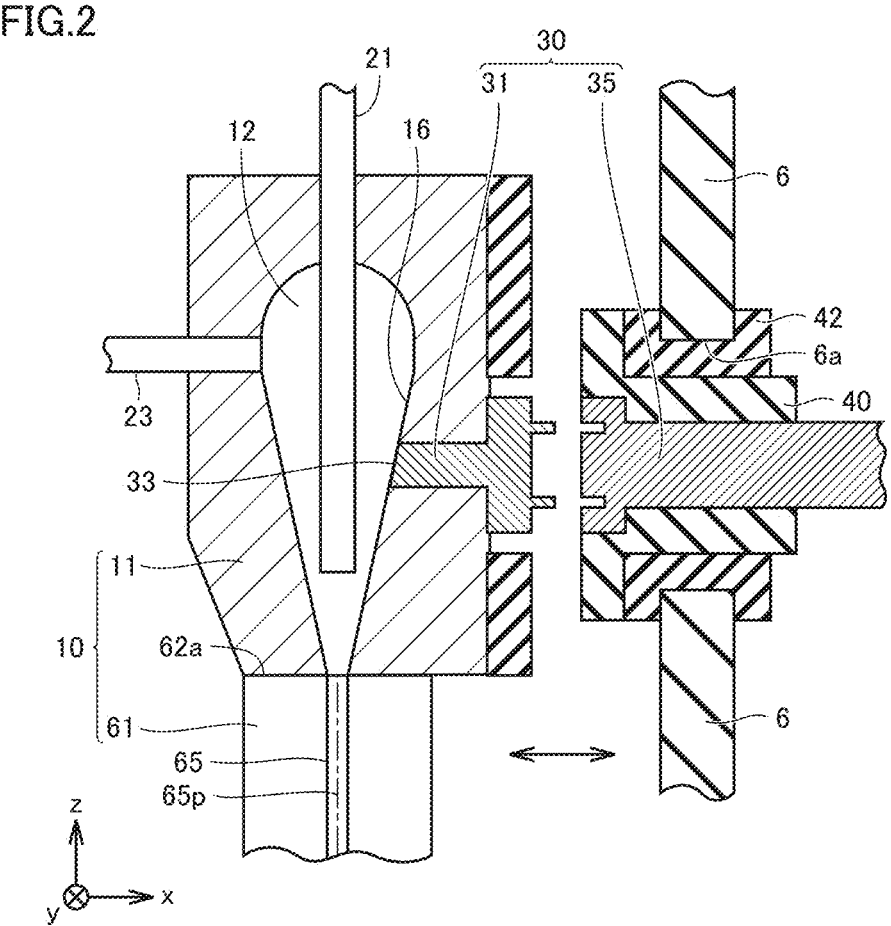
FIG. 2 is a schematic partial enlarged cross sectional view of the particle sorting apparatus according to each of first to fourth embodiments.

As shown in FIGS. 1 and 2, vibration electrode 30 extends from cavity 12 of chamber 11 to outside of chamber 11. Vibration electrode 30 extends through opening 6a of wall 6 to pass through wall 6. Vibration electrode 30 includes a vibration electrode portion 31 and an electrically conductive portion 35. Vibration electrode portion 31 has a plurality of protrusions fitted in a plurality of recesses of electrically conductive portion 35, and is therefore electrically and mechanically connected to electrically conductive portion 35. Vibration electrode portion 31 can be positioned relative to electrically conductive portion 35.

Vibration electrode portion 31 is provided in chamber 11. Vibration electrode portion 31 extends from cavity 12 of chamber 11 to the outside of chamber 11. An end surface 33 of vibration electrode portion 31 is exposed to cavity 12 of chamber 11. End surface 33 of vibration electrode portion 31 is smoothly continuous to a surface 16 defined by cavity 12 of chamber 11. The sheath flow in cavity 12 of chamber 11 can be prevented from being disturbed by end surface 33 of vibration electrode portion 31.

Electrically conductive portion 35 is inserted in opening 6a of wall 6, and is therefore attached to wall 6. Electrically conductive portion 35 extends through opening 6a to pass through wall 6. Specifically, electrically conductive portion 35 is received in an insulation sleeve 40. Insulation sleeve 40 is inserted in a hole of a sealing member 42. Sealing member 42 is inserted in opening 6a. Sealing member 42 is an elastic seal such as a rubber seal, for example. Sealing member 42 can be deformed elastically.

Vibration electrode portion 31 is detachably connected to electrically conductive portion 35. Accordingly, flow chamber 10 can be attached to and detached from wall 6. Used flow chamber 10 can be readily exchanged with a flow chamber 10 sterilized by applying radiation or heat.

Vibration element 44 is connected to vibration electrode 30. Specifically, vibration element 44 is coupled to electrically conductive portion 35. Vibration element 44 has a ring shape, and electrically conductive portion 35 is fitted in the hole of vibration element 44. Ultrasonic vibrations of vibration element 44 are transmitted to the sheath flow in cavity 12 of chamber 11 via vibration electrode 30. Vibration element 44 is a piezoelectric element, for example. A jet flow 100 is sent out from nozzle 68. The vibrations generated in vibration element 44 are transmitted to jet flow 100. Accordingly, jet flow 100 is broken off into a droplet 104 at break-off point 101, which is a lower end portion of jet flow 100. Each of droplets 104 includes one particle 105.

Charge supply unit 46 is connected to electrically conductive portion 35. Charge supply unit 46 supplies charges corresponding to the identification information of particle 105 included in droplet 104, to droplet 104 via vibration electrode 30, the sheath flow, and jet flow 100. Specifically, charge supply unit 46 changes the polarity and amount of charges to be supplied to droplet 104 in accordance with the identification information of particle 105 included in droplet 104.

Figure 4:
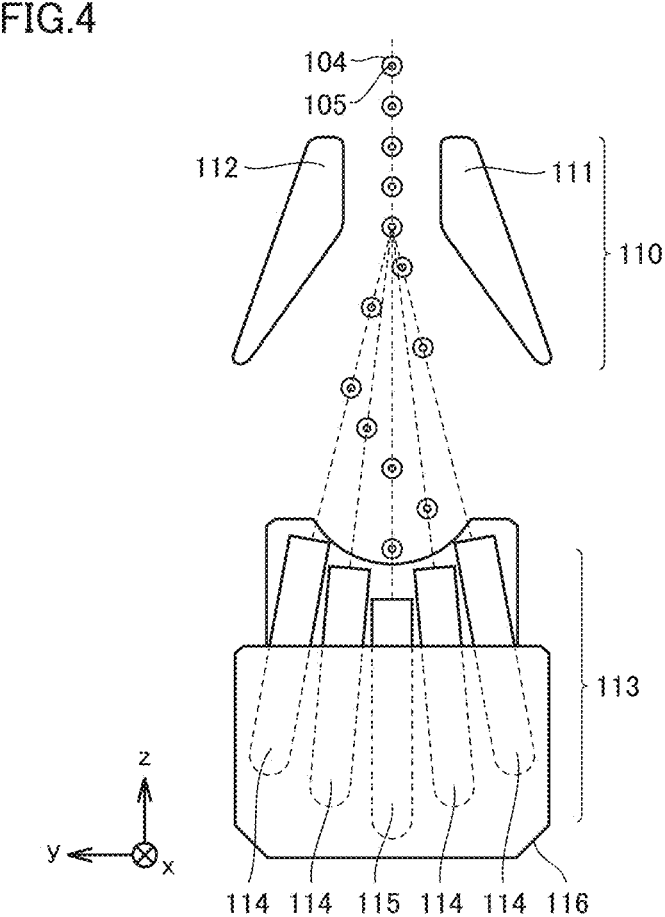
FIG. 4 is a schematic partial enlarged view of a sorting unit and a sample collection unit included in the particle sorting apparatus according to each of the first to fourth embodiments.

As shown in FIG. 4, sorting unit 110 is a deflector that changes a falling direction of a droplet 104. Sorting unit 110 is attached to wall 6. Specifically, sorting unit 110 includes a pair of deflection electrodes 111, 112. By applying voltage between deflection electrodes 111, 112, an electric field is formed between deflection electrodes 111, 112. Each droplet 104 supplied with the charges from charge supply unit 46 receives force by the electric field between deflection electrodes 111, 112. Depending on the polarity and amount of charges supplied to droplet 104, the falling direction of droplet 104 is changed.

Collection unit 113 includes a plurality of sample collection members 114 and a waste-liquid collection member 115. Collection unit 113 further includes a holder 116 that holds the plurality of sample collection members 114 and waste-liquid collection member 115. Holder 116 is attached to wall 6. Droplets 104 having falling directions changed in sorting unit 110 are collected in corresponding sample collection members 114. In this way, particles 105 included in droplets 104 can be sorted in accordance with respective pieces of identification information of particles 105. An unnecessary droplet 104 is collected in waste-liquid collection member 115.

Referring to FIG. 1, moving mechanism 50 moves flow cell 60. Moving mechanism 50 is, for example, a triaxial moving mechanism, and can move flow channel 65 in the first direction (z direction), the second direction (x direction), and the third direction (y direction). Moving mechanism 50 is attached to wall 6 via fixing member 49. Moving mechanism 50 is coupled to vibration electrode 30 (electrically conductive portion 35) via a movable member 48. Vibration electrode 30 (electrically conductive portion 35) can be moved within a range in which sealing member 42 can be deformed. Moving mechanism 50 moves movable member 48 and vibration electrode 30 to move flow chamber 10. Flow cell 60 attached to flow chamber 10 can be moved by moving mechanism 50.

Imaging element 120 faces transparent window member 121 fitted in opening 6c of wall 6. Imaging element 120 obtains an image regarding flow axis 65p of flow channel 65. Imaging element 120 is not limited particularly and is a CCD camera or a CMOS camera, for example. The image regarding flow axis 65p of flow channel 65 is an image of liquid (for example, jet flow 100) flowing out of flow cell 60, for example. Since flow axis 65p of flow channel 65 is coaxial with the flow axis of the liquid flowing out of flow cell 60, the image of the liquid flowing out of flow cell 60 is an exemplary image regarding flow axis 65p of flow channel 65. The image of the liquid flowing out of flow cell 60 may include an image of break-off point 101 of the liquid flowing out of flow cell 60. Flow channel 65 and flow axis 65p thereof extend in the first direction (z direction).

Figure 5:
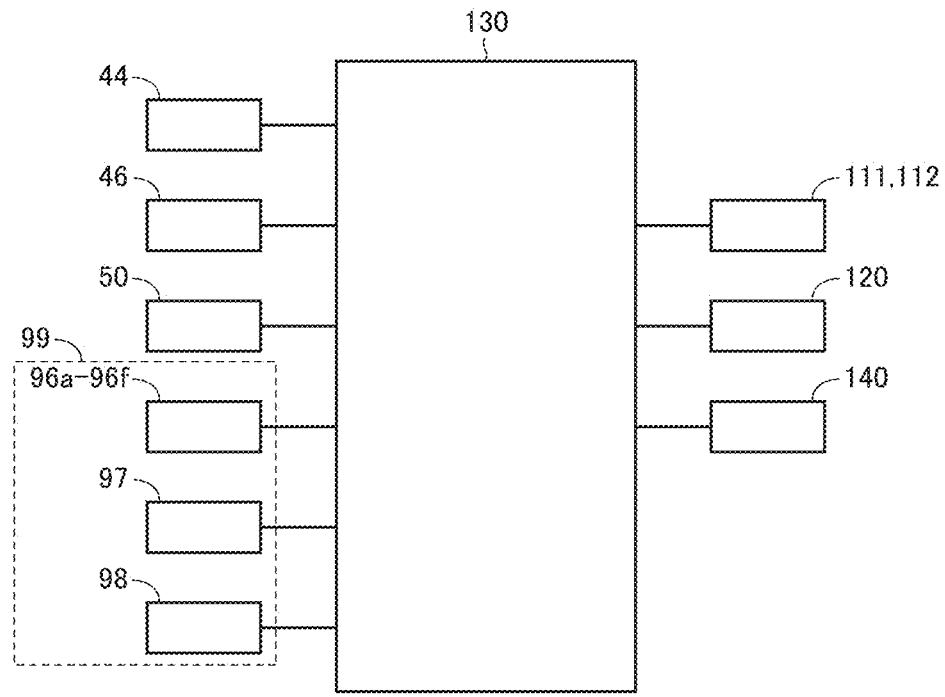
FIG. 5 is a control block diagram of the particle sorting apparatus according to each of the first and third embodiments.

As shown in FIG. 5, controller 130 is communicatively connected to vibration element 44, charge supply unit 46, moving mechanism 50, light intensity detector 99 (first light detectors 96a to 96f, second light detector 97, and third light detector 98), deflection electrodes 111, 112, imaging element 120, and storage unit 140.

Storage unit 140 is a hard disk or a semiconductor memory, for example. In storage unit 140, information is stored such as: a first speed; a second speed; the intensity of fluorescence 77 measured by each of first light detectors 96a to 96f; the intensity of forward-scattered light 77f measured by second light detector 97; the intensity of side-scattered light 77s measured by third light detector 98; and the image regarding flow axis 65p of flow channel 65 and obtained by imaging element 120, for example. Controller 130 sends these pieces of information to storage unit 140 and reads them from storage unit 140.

Controller 130 is a processor such as a CPU, for example. Controller 130 receives the intensity of fluorescence 77 measured by each of first light detectors 96a to 96f. Controller 130 receives the intensity of forward-scattered light 77f measured by second light detector 97. Controller 130 receives the intensity of side-scattered light 77s measured by third light detector 98. Controller 130 obtains the identification information of particle 105 by analyzing at least one of the intensity of fluorescence 77, the intensity of forward-scattered light 77f, or the intensity of side-scattered light 77s, each of which is detected by light intensity detector 99.

Controller 130 controls vibration element 44 to control the amplitude, frequency, and the like of the ultrasonic vibration to be supplied from vibration element 44. Controller 130 controls charge supply unit 46. Specifically, in accordance with the identification information of particle 105, controller 130 controls the polarity and amount of charges to be supplied from charge supply unit 46 to vibration electrode 30. Controller 130 controls an electric field applied between deflection electrodes 111, 112.

Controller 130 receives the image of flow axis 65p of flow channel 65, the image being obtained by imaging element 120. Controller 130 controls moving mechanism 50. Therefore, controller 130 can control movement direction, movement distance, and movement speed of flow cell 60 (flow chamber 10).

Controller 130 performs a coarse adjustment onto the position of flow cell 60 based on the image regarding flow axis 65p of flow channel 65 while controlling moving mechanism 50 to continuously move flow cell 60 at the first speed. The image regarding flow axis 65p of flow channel 65 is, for example, the image of the liquid (for example, jet flow 100) flowing out of flow cell 60.

Specifically, controller 130 causes flow cell 60 to be continuously moved at the first speed in the optical axis direction (second direction (x direction)) of imaging element 120 in flow cell 60. Controller 130 performs a coarse adjustment onto the position of flow cell 60 in the second direction (x direction) such that the liquid flowing out of flow cell 60 looks thinnest in the image, obtained by imaging element 120, of the liquid flowing out of flow cell 60. It should be noted that when the liquid flowing out of flow cell 60 looks thinnest in the image, obtained by imaging element 120, of the liquid flowing out of flow cell 60, the liquid flowing out of flow cell 60 is located at the focal position of imaging element 120.

Then, controller 130 causes flow cell 60 to be continuously moved in the third direction (y direction) at the first speed. Controller 130 performs a coarse adjustment onto the position of flow cell 60 in the third direction (y direction) such that the liquid (jet flow 100) flowing out of flow cell 60 is located at a first reference position in the third direction (y direction) in the image, obtained by imaging element 120, of the liquid flowing out of flow cell 60. In one example, the first reference position may be a position of the liquid flowing out of flow cell 60 in the third direction (y direction) in the image of the liquid flowing out of flow cell 60 before replacement of flow cell 60. In another example, the first reference position may be the center in the third direction (y direction) in the image, obtained by imaging element 120, of the liquid flowing out of flow cell 60.

Controller 130 performs a final adjustment onto the position of flow cell 60 to allow a first intensity of the first light emitted from the light emitting object to be maximum, while controlling moving mechanism 50 to move flow cell 60 at the second speed that is lower than the first speed, the first intensity being detected by light intensity detector 99. For example, the light emitting object is a fluorescent bead, and the first light includes forward-scattered light 77f emitted from the fluorescent bead and fluorescence 77 emitted from the fluorescent bead.

In one example, the first intensity of the first light emitted from the light emitting object may be detected using light intensity detector 99 while continuously moving flow cell 60 at the second speed that is lower than the first speed. In another example, the first intensity of the first light emitted from the light emitting object may be detected using light intensity detector 99 while moving flow cell 60 stepwisely at the second speed that is lower than the first speed. That is, flow cell 60 repeats: movement by a small distance; and temporary stop. Light intensity detector 99 detects the first intensity of the first light emitted from the light emitting object using light intensity detector 99 during the temporary stop of flow cell 60. In the case where flow cell 60 is stepwisely moved, the second speed of flow cell 60 is obtained by dividing the total travel distance of flow cell 60 by the total of the travel time of flow cell 60 and the time of the temporary stop of flow cell 60.

Specifically, controller 130 causes flow cell 60 to be moved at the second speed in the optical axis direction (second direction (x direction)) of imaging element 120 in flow cell 60. Controller 130 performs a final adjustment onto the position of flow cell 60 in the second direction (x direction) to allow the intensity of forward-scattered light 77f emitted from the light emitting object to be maximum, the intensity of forward-scattered light 77f being detected by second light detector 97. Then, controller 130 causes flow cell 60 to be moved in the third direction (y direction) at the second speed. Controller 130 performs a final adjustment onto the position of flow cell 60 in the third direction (y direction) to allow the intensity of fluorescence 77 emitted from the light emitting object to be maximum, the intensity of fluorescence 77 being detected by first light detectors 96a to 96f.

The final adjustment onto the position of flow cell 60 is performed after the coarse adjustment onto the position of flow cell 60. Therefore, the distance by which flow cell 60 is moved at the second speed in the final adjustment onto the position of flow cell 60 is shorter than the distance by which flow cell 60 is moved at the first speed in the coarse adjustment onto the position of flow cell 60.

The following describes a method of sorting particles 105 using particle sorting apparatus 1 according to the present embodiment.

The sheath liquid is supplied from second tank 22 to cavity 12 of chamber 11. The sample liquid including particles 105 is supplied from first tank 20 to cavity 12 of chamber 11 filled with the sheath liquid. In cavity 12 of chamber 11, the sample liquid is enclosed with the sheath liquid to form the sheath flow. The sheath flow flows into flow cell 60. Particles 105 included in the sample liquid are arranged in one line along the flow axis (center axis) 65p of flow channel 65 of flow cell 60.

Each of particles 105 arranged in one line within flow channel 65 is irradiated with laser light 71 from light source unit 70. Fluorescence 77, forward-scattered light 77f, and side-scattered light 77s are emitted from particle 105. Light intensity detector 99 detects at least one of fluorescence 77, forward-scattered light 77f, or side-scattered light 77s. Controller 130 analyzes at least one of fluorescence 77, forward-scattered light 77f, or side-scattered light 77s, so as to obtain the identification information of particle 105.

The sheath flow including particles 105 flows out of flow cell 60 as jet flow 100. Controller 130 controls vibration element 44 to control the amplitude, frequency, and the like of ultrasonic vibration to be supplied from vibration element 44. The ultrasonic vibration is applied from vibration element 44 to jet flow 100 through vibration electrode 30. Jet flow 100 is broken off into a droplet 104 at break-off point 101. Each of droplets 104 includes one particle 105.

Controller 130 controls the polarity and amount of charges to be supplied from charge supply unit 46 to vibration electrode 30 in accordance with the identification information of particle 105. The charges are supplied to the sheath flow and jet flow 100 immediately before droplet 104 including particle 105 is formed at break-off point 101. Thus, droplet 104 broken off from jet flow 100 at break-off point 101 is supplied with the charges corresponding to the identification information of particle 105 included in droplet 104. Charged droplet 104 is deflected by sorting unit 110. Droplets 104 are collected in the plurality of sample collection members 114 or waste-liquid collection member 115. In this way, particles 105 included in droplets 104 are sorted.

Figure 6:
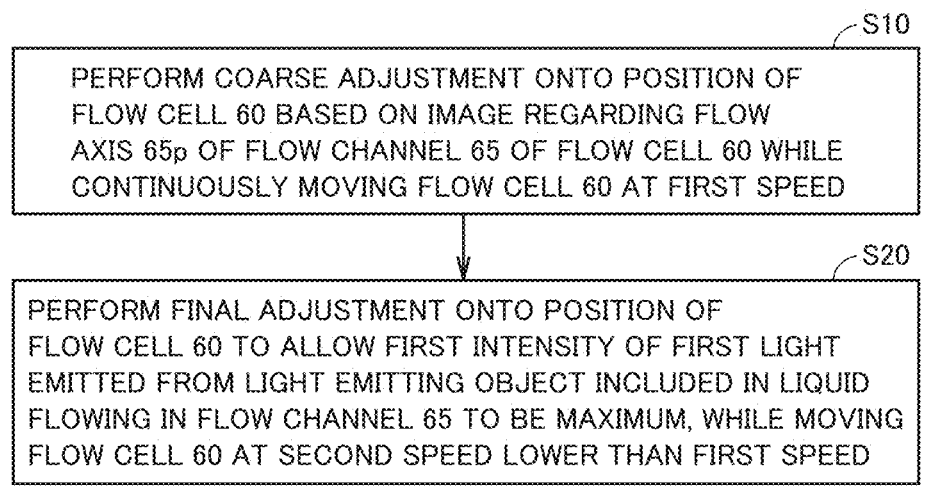
FIG. 6 is a diagram showing a flowchart of a method of aligning a flow cell according to each of the first and second embodiments.
Figure 7:
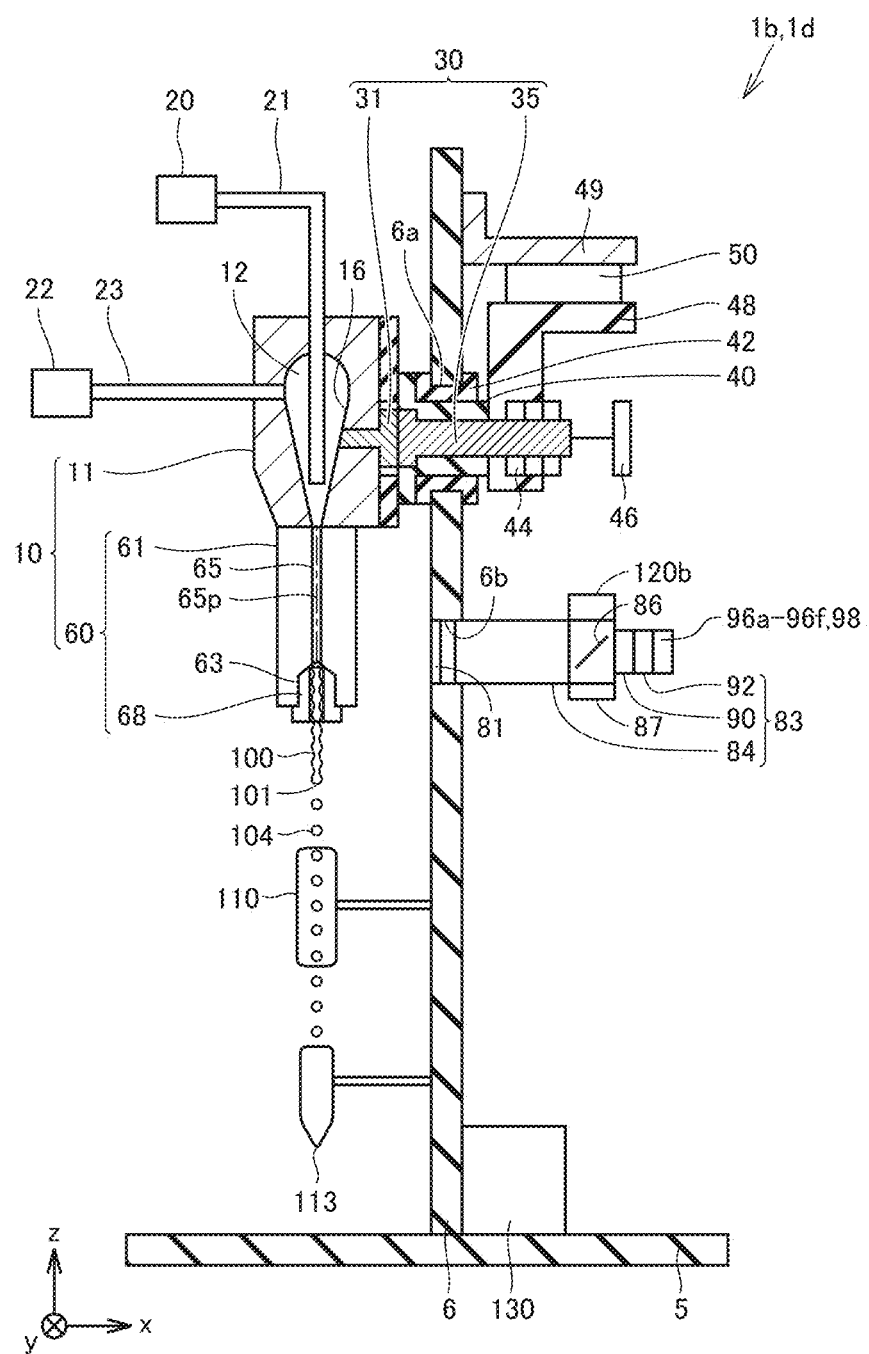
FIG. 7 is a schematic cross sectional view of the particle sorting apparatus according to each of the second and fourth embodiments.
Figure 8:
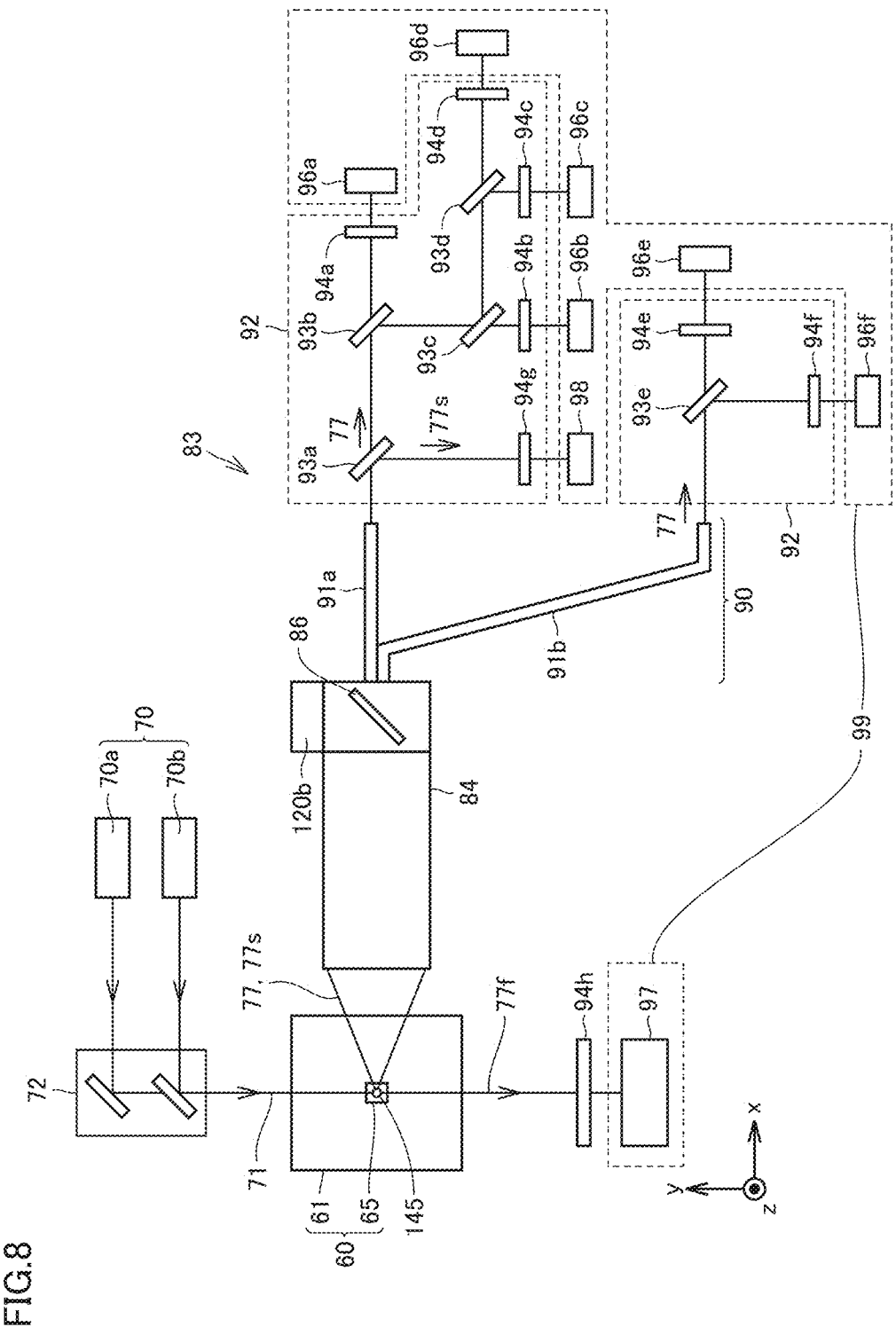
FIG. 8 is a schematic diagram showing an optical system included in the particle sorting apparatus according to each of the second and fourth embodiments.

A method of aligning flow cell 60 according to the first embodiment will be described with reference to FIG. 6. In one example, the method of aligning flow cell 60 according to the present embodiment is performed before using particle sorting apparatus 1 to sort the sample particles such as biological particles labeled with a fluorescent material. In another example, the method of aligning flow cell 60 according to the present embodiment is performed after flow cell 60 or flow chamber 10 is replaced.

The method of aligning flow cell 60 according to the present embodiment includes a coarse adjustment step (S10) and a final adjustment step (S20).

In the coarse adjustment step (S10), a coarse adjustment is performed onto the position of flow cell 60 based on the image regarding flow axis 65p of flow channel 65 of flow cell 60 while continuously moving flow cell 60 at the first speed. The image regarding flow axis 65p of flow channel 65 is, for example, the image of the liquid (jet flow 100) flowing out of flow cell 60.

Specifically, controller 130 causes flow cell 60 to be continuously moved at the first speed in the optical axis direction (second direction (x direction)) of imaging element 120 in flow cell 60. In the image, obtained by imaging element 120, of the liquid (for example, jet flow 100) flowing out of flow cell 60, controller 130 performs a coarse adjustment onto the position of flow cell 60 in the second direction (x direction) such that the liquid flowing out of flow cell 60 looks thinnest.

Then, controller 130 causes flow cell 60 to be continuously moved in the third direction (y direction) at the first speed. Controller 130 performs a coarse adjustment onto the position of flow cell 60 in the third direction (y direction) such that the liquid (for example, jet flow 100) flowing out of flow cell 60 is located at a first reference position in the third direction (y direction) in the image, obtained by imaging element 120, of the liquid flowing out of flow cell 60. In one example, the first reference position may be a position of the liquid flowing out of flow cell 60 in the third direction (y direction) in the image of the liquid flowing out of flow cell 60 before replacement of flow cell 60. In another example, the first reference position may be the center in the third direction (y direction) in the image, obtained by imaging element 120, of the liquid flowing out of flow cell 60.

In the final adjustment step (S20), a final adjustment is performed onto the position of flow cell 60 to allow the first intensity of the first light emitted from the light emitting object included in the liquid flowing in flow channel 65 to be maximum, while moving flow cell 60 at a second speed lower than the first speed. For example, the light emitting object is a fluorescent bead, and the first light includes forward-scattered light 77f emitted from the fluorescent bead and fluorescence 77 emitted from the fluorescent bead.

Specifically, controller 130 causes flow cell 60 to be moved at the second speed in the optical axis direction (second direction (x direction)) of imaging element 120 in flow cell 60. Controller 130 performs a final adjustment onto the position of flow cell 60 in the second direction (x direction) to allow the intensity of forward-scattered light 77f emitted from the fluorescent bead to be maximum, the intensity of forward-scattered light 77f being detected by second light detector 97. Then, controller 130 causes flow cell 60 to be moved in the third direction (y direction) at the second speed. Controller 130 performs a final adjustment onto the position of flow cell 60 in the third direction (y direction) to allow the intensity of fluorescence 77 emitted from the fluorescence bead to be maximum, the intensity of fluorescence 77 being detected by first light detectors 96a to 96f.

The final adjustment step (S20) is performed after the coarse adjustment step (S10). Therefore, the distance by which flow cell 60 is moved at the second speed in the final adjustment step (S20) is shorter than the distance by which flow cell 60 is moved at the first speed in the coarse adjustment step (S10).

As required, flow cell 60 may be aligned in the first direction (z direction) also by performing the coarse adjustment step (S10) that is based on the image regarding flow axis 65p of flow channel 65 of flow cell 60 and the final adjustment step (S20) that is based on the first intensity of the first light.

In a modification of the present embodiment, the light emitting object is a bead or bubble. The bead may be a fluorescent bead or a bead including no fluorescent material. In the case of aligning flow cell 60, a liquid including a bead including no fluorescent material or a liquid including a bubble may be stored in first tank 20. The bubble has a diameter of, for example, more than or equal to 1 μm and less than or equal to 30 μm. When the bead or bubble is irradiated with laser light 71, forward-scattered light 77f and side-scattered light 77s are emitted from the bead or bubble. The first light includes forward-scattered light 77f and side-scattered light 77s emitted from the bead or bubble.

In this modification, in the final adjustment step (S20), the position of flow cell 60 in the third direction (y direction) is aligned based on side-scattered light 77s emitted from the bead or bubble. Specifically, controller 130 causes flow cell 60 to be moved in the third direction (y direction) at the second speed. Controller 130 performs a final adjustment onto the position of flow cell 60 in the third direction (y direction) to allow the intensity of side-scattered light 77s emitted from the bead or bubble to be maximum, the intensity of side-scattered light 77s being detected by third light detector 98.

The following describes effects of particle sorting apparatus 1 and the method of aligning flow cell 60 according to the present embodiment.

Particle sorting apparatus 1 of the present embodiment includes: flow cell 60 including flow channel 65; imaging element 120; light intensity detector 99; moving mechanism 50; and controller 130. Imaging element 120 obtains the image regarding flow axis 65*p* of flow channel 65. Light intensity detector 99 detects the intensity of the light emitted from the light emitting object included in the liquid flowing in flow channel 65. Moving mechanism 50 moves flow cell 60. Controller 130 controls moving mechanism 50. Controller 130 performs a coarse adjustment onto the position of flow cell 60 based on the image regarding flow axis 65*p* of flow channel 65 while controlling moving mechanism 50 to continuously move flow cell 60 at the first speed. Controller 130 performs a final adjustment onto the position of flow cell 60 to allow the first intensity of the first light emitted from the light emitting object to be maximum while controlling moving mechanism 50 to move flow cell 60 at the second speed that is lower than the first speed, the first intensity of the first light being detected by light intensity detector 99.

In particle sorting apparatus 1, after flow cell 60 is moved continuously at the first speed to perform the coarse adjustment onto flow cell 60, flow cell 60 is moved at the second speed to perform the final adjustment onto the position of flow cell 60. Therefore, in particle sorting apparatus 1 of the present embodiment, the distance by which flow cell 60 is moved at the second speed to perform the final adjustment onto the position of flow cell 60 is reduced as compared with a comparative example in which flow cell 60 is aligned only by the final adjustment step without performing the coarse adjustment step. Particle sorting apparatus 1 can align flow cell 60 in a shorter period of time.

The method of aligning flow cell 60 according to the present embodiment includes the coarse adjustment step (S10) and the final adjustment step (S20). In the coarse adjustment step (S10), a coarse adjustment is performed onto the position of flow cell 60 based on the image regarding flow axis 65*p* of flow channel 65 of flow cell 60 while continuously moving flow cell 60 at the first speed. In the final adjustment step (S20), after the coarse adjustment step (S10), a final adjustment is performed onto the position of flow cell 60 to allow the first intensity of the first light emitted from the light emitting object included in the liquid flowing in flow channel 65 to be maximum, while moving flow cell 60 at the second speed that is lower than the first speed.

In the method of aligning flow cell 60 according to the present embodiment, after flow cell 60 is moved continuously at the first speed to perform the coarse adjustment onto flow cell 60, flow cell 60 is moved at the second speed to perform the final adjustment onto the position of flow cell 60. Therefore, in the method of aligning flow cell 60 according to the present embodiment, the distance by which flow cell 60 is moved at the second speed to perform the final adjustment onto the position of flow cell 60 is reduced as compared with the comparative example in which flow cell 60 is aligned only by the final adjustment step without performing the coarse adjustment step. According to the method of aligning flow cell 60 in the present embodiment, flow cell 60 can be aligned in a shorter period of time.

In each of particle sorting apparatus 1 according to the present embodiment and the method of aligning flow cell 60 according to the present embodiment, the light emitting object is a bead including no fluorescent material, or is a bubble. Therefore, the fluorescent material is prevented from remaining in chamber 11 and flow cell 60 upon the end of the alignment of flow cell 60. With the light emitting object that is a bubble or a bead including no fluorescent material, flow cell 60 is maintained to be clean at the start of sorting the sample particles such as biological particles labeled with a fluorescent material, and the sample particles can be sorted with improved precision.

In particle sorting apparatus 1 according to the present embodiment and the method of aligning flow cell 60 according to the present embodiment, the image regarding flow axis 65*p* of flow channel 65 is an image of the liquid (for example, jet flow 100) flowing out of flow cell 60. Therefore, flow cell 60 can be aligned in a shorter period of time.

Second Embodiment

The following describes a particle sorting apparatus 1*b* according to a second embodiment with reference to FIGS. 2, 4 and 7 to 9. Particle sorting apparatus 1*b* of the present embodiment includes a configuration similar to that of particle sorting apparatus 1 of the first embodiment, but is different therefrom mainly in the following points.

Particle sorting apparatus 1*b* includes an imaging element 120*b* instead of imaging element 120 of the first embodiment. Particle sorting apparatus 1*b* further includes a reflective member 86 and a reflective member driving mechanism 87.

Figure 10:
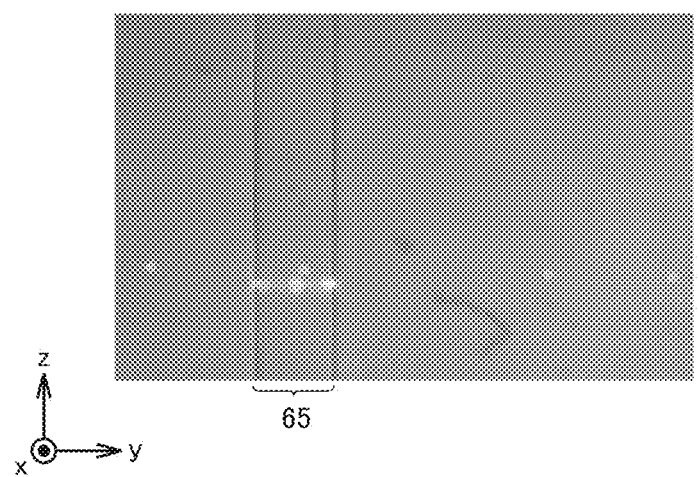
FIG. 10 is a diagram showing an exemplary image of a flow channel obtained by an imaging element of the particle sorting apparatus according to each of the second and fourth embodiments.

Imaging element 120*b* obtains an image regarding flow axis 65*p* of flow channel 65. Imaging element 120*b* is not particularly limited, but is, for example, a CCD camera or a CMOS camera. The image regarding flow axis 65*p* of flow channel 65 is, for example, an image of flow channel 65 (see FIG. 10).

Specifically, reflective member 86 is disposed between detection side lens optical system 84 and optical fiber array 90. Reflective member 86 reflects the image of flow cell 60 toward imaging element 120*b*. Reflective member 86 is a half mirror, for example. Reflective member driving mechanism 87 rotates or moves reflective member 86.

Figure 9:
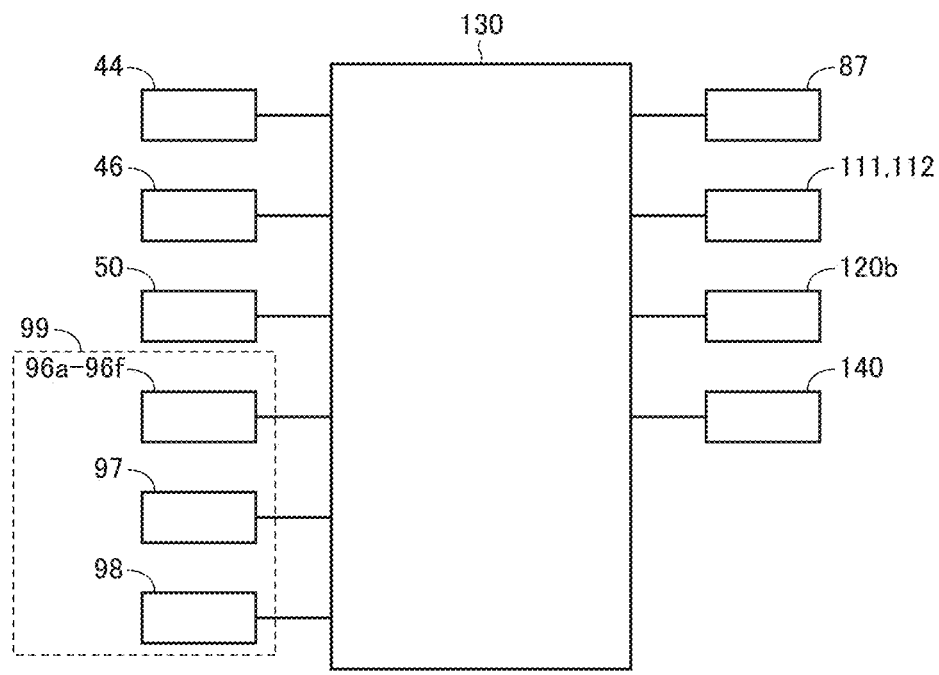
FIG. 9 is a control block diagram of the particle sorting apparatus according to each of the second and fourth embodiments.

As shown in FIG. 9, controller 130 is communicatively connected to imaging element 120*b* and reflective member driving mechanism 87. Controller 130 receives the image of flow channel 65 obtained by imaging element 120*b*. The image of flow channel 65 is stored in storage unit 140. Controller 130 controls reflective member driving mechanism 87.

Controller 130 controls reflective member driving mechanism 87 to position reflective member 86 on the optical axis of detection optical system 83. Reflective member 86 reflects the image of flow channel 65 toward imaging element 120*b*. Controller 130 controls reflective member driving mechanism 87 to retract reflective member 86 from the optical axis of detection optical system 83. Therefore, the intensity of fluorescence 77 measured by first light detectors 96*a* to 96*f* and the intensity of side-scattered light 77*s* measured by third light detector 98 are prevented from being decreased by reflective member 86.

Controller 130 performs a coarse adjustment onto the position of flow cell 60 based on the image regarding flow axis 65*p* of flow channel 65 while controlling moving mechanism 50 to continuously move flow cell 60 at the first speed. The image regarding flow axis 65*p* of flow channel 65 is, for example, the image of flow channel 65.

Specifically, controller 130 causes flow cell 60 to be continuously moved at the first speed in the optical axis direction (second direction (x direction)) of imaging element 120*b* in flow cell 60. Controller 130 performs a coarse adjustment onto the position of flow cell 60 in the second direction (x direction) such that the side wall of flow channel 65 looks thinnest in the image of flow channel 65 obtained by imaging element 120*b*. It should be noted that when the side wall of flow channel 65 looks thinnest in the image of flow channel 65 obtained by imaging element 120b, flow channel 65 is located at the focal position of imaging element 120b.

Then, controller 130 causes flow cell 60 to be continuously moved in the third direction (y direction) at the first speed. Controller 130 performs a coarse adjustment onto the position of flow cell 60 in the third direction (y direction) such that the side wall of flow channel 65 is located at the first reference position (see FIG. 10) in the third direction (y direction) in the image of flow channel 65 obtained by imaging element 120b. In one example, the first reference position may be the position of the side wall of flow channel 65 in the third direction (y direction) in the image of flow channel 65 before replacement of flow cell 60. In another example, the first reference position may be the center in the third direction (y direction) in the image of flow channel 65 obtained by imaging element 120b.

As with the first embodiment, controller 130 performs a final adjustment onto the position of flow cell 60 to allow the first intensity of the first light emitted from the light emitting object to be maximum, while controlling moving mechanism 50 to move flow cell 60 at the second speed that is lower than the first speed, the first intensity of the first light being detected by light intensity detector 99. For example, the light emitting object is a fluorescent bead, and the first light includes forward-scattered light 77f emitted from the fluorescent bead and fluorescence 77 emitted from the fluorescent bead.

A particle sorting method using particle sorting apparatus 1b of the present embodiment is the same as the particle sorting method using particle sorting apparatus 1 of the first embodiment. When sorting the sample particles after flow chamber 10 is aligned, controller 130 controls reflective member driving mechanism 87 to retract reflective member 86 from the optical axis of detection optical system 83. Therefore, the intensity of fluorescence 77 measured by first light detectors 96a to 96f and the intensity of side-scattered light 77s measured by third light detector 98 are prevented from being decreased by reflective member 86.

A method of aligning flow cell 60 according to the second embodiment will be described with reference to FIG. 6. The method of aligning flow cell 60 according to the present embodiment includes the same steps as those of the method of aligning flow cell 60 according to the first embodiment, but is mainly different therefrom in the following points.

In the coarse adjustment step (S10) of the method of aligning flow cell 60 according to the present embodiment, the image regarding flow axis 65p of flow channel 65 is obtained using imaging element 120b. The image regarding flow axis 65p of flow channel 65 is the image of flow channel 65. During the coarse adjustment step (S10), controller 130 controls reflective member driving mechanism 87 to position reflective member 86 on the optical axis of detection optical system 83. Reflective member 86 reflects the image of flow channel 65 toward imaging element 120b.

Specifically, controller 130 causes flow cell 60 to be continuously moved at the first speed in the optical axis direction (second direction (x direction)) of imaging element 120b in flow cell 60. Controller 130 performs a coarse adjustment onto the position of flow cell 60 in the second direction (x direction) such that the side wall of flow channel 65 looks thinnest in the image of flow channel 65 obtained by imaging element 120b.

Then, controller 130 causes flow cell 60 to be continuously moved in the third direction (y direction) at the first speed. Controller 130 performs a coarse adjustment onto the position of flow cell 60 in the third direction (y direction) such that the side wall of flow channel 65 is positioned at the first reference position (see FIG. 10) from the first end side in the third direction (y direction) in the image of flow channel 65 obtained by imaging element 120b. In one example, the first reference position may be the position of the side wall of flow channel 65 in the third direction (y direction) in the image of flow channel 65 before replacement of flow cell 60. In another example, the first reference position may be the center in the third direction (y direction) in the image of flow channel 65 obtained by imaging element 120b.

The fine adjustment step (S20) in the present embodiment is the same as the fine adjustment step (S20) in the first embodiment. During the fine adjustment step (S20) of the present embodiment, controller 130 controls reflective member driving mechanism 87 to retract reflective member 86 from the optical axis of detection optical system 83. Therefore, the intensity of fluorescence 77 measured by first light detectors 96a to 96f and the intensity of side-scattered light 77s measured by third light detector 98 are prevented from being decreased by reflective member 86.

In the modification of the present embodiment, as with the modification of the first embodiment, the light emitting object is a bead or bubble. The first light includes forward-scattered light 77f and side-scattered light 77s emitted from the bead or bubble. In this modification, in the final adjustment step (S20), the position of flow cell 60 in the third direction (y direction) is aligned based on side-scattered light 77s emitted from the bead or bubble.

Particle sorting apparatus 1b and the method of aligning flow cell 60 according to the present embodiment has the following effects similar to those of particle sorting apparatus 1 and the method of aligning flow cell 60 according to the first embodiment.

In each of particle sorting apparatus 1b according to the present embodiment and the method of aligning flow cell 60 according to the present embodiment, the image regarding flow axis 65p of flow channel 65 is the image of flow channel 65. Therefore, flow cell 60 can be aligned in a shorter period of time.

Third Embodiment

A particle sorting apparatus 1c according to a third embodiment will be described with reference to FIGS. 1 to 5. Particle sorting apparatus 1c of the present embodiment has a configuration similar to that of particle sorting apparatus 1 of the first embodiment, but is mainly different therefrom in the following points.

In the present embodiment, controller 130, which is configured in the same manner as in the first embodiment, is further configured as follows. Controller 130 performs a fine adjustment onto the position of flow cell 60 to allow a second intensity of second light emitted from the light emitting object to be maximum, while controlling moving mechanism 50 to continuously move flow cell 60 at a third speed that is lower than the first speed and that is higher than the second speed, the second intensity of the second light being detected by light intensity detector 99. For example, the light emitting object is a fluorescent bead, and the second light includes forward-scattered light 77f emitted from the fluorescent bead and fluorescence 77 emitted from the fluorescent bead. Storage unit 140 further stores information of the third speed.

Specifically, controller 130 causes flow cell 60 to be continuously moved at the third speed in the optical axis direction (the second direction (x direction)) of imaging element 120 in flow cell 60. Controller 130 performs a fine adjustment onto the position of flow cell 60 in the second direction (x direction) to allow the intensity of forward-scattered light 77*f* emitted from the fluorescent bead to be maximum, the intensity of forward-scattered light 77*f* being detected by second light detector 97. Then, controller 130 causes flow cell 60 to be moved in the third direction (y direction) at the third speed. Controller 130 performs a fine adjustment onto the position of flow cell 60 in the third direction (y direction) to allow the intensity of fluorescence 77 emitted from the fluorescence bead to be maximum, the intensity of fluorescence 77 being detected by first light detectors 96*a* to 96*f*.

The fine adjustment onto the position of flow cell 60 is performed after the coarse adjustment onto the position of flow cell 60. Therefore, the distance by which flow cell 60 is moved at the third speed in the fine adjustment onto the position of flow cell 60 is shorter than the distance by which flow cell 60 is moved at the first speed in the coarse adjustment onto the position of flow cell 60.

The final adjustment onto the position of flow cell 60 is performed after the fine adjustment onto the position of flow cell 60. Therefore, the distance by which flow cell 60 is moved at the second speed in the final adjustment onto the position of flow cell 60 is shorter than the distance by which flow cell 60 is moved at the third speed in the fine adjustment onto the position of flow cell 60. The distance by which flow cell 60 is moved at the second speed in the final adjustment in the present embodiment is shorter than the distance by which flow cell 60 is moved at the second speed in the final adjustment in the first embodiment.

The particle sorting method using particle sorting apparatus 1*c* of the present embodiment is the same as the particle sorting method using particle sorting apparatus 1 of the first embodiment.

Figure 11:
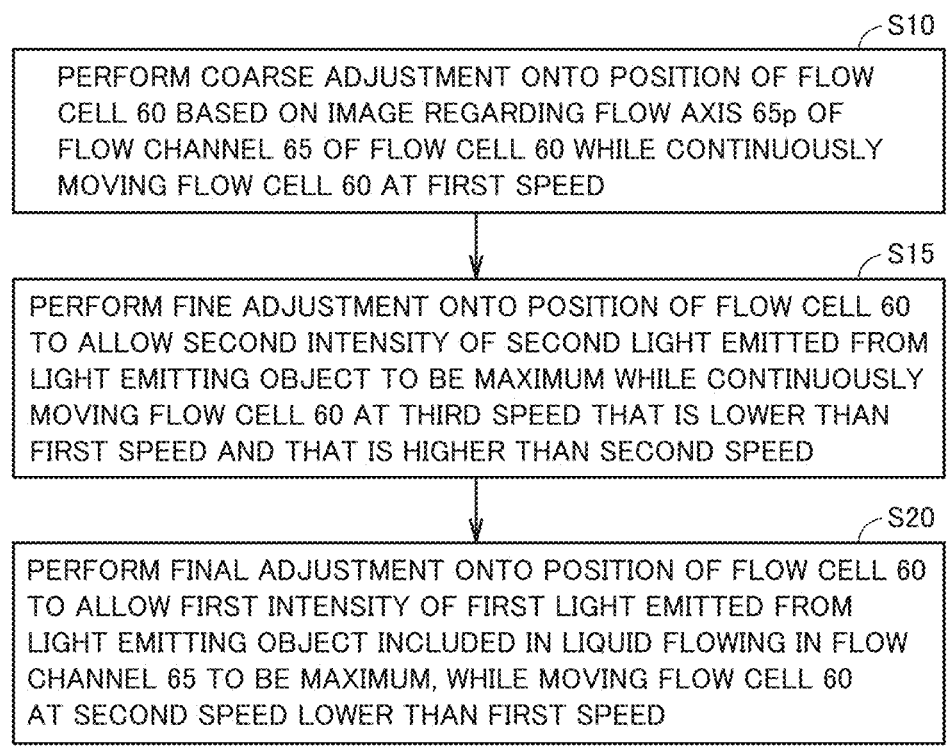
FIG. 11 is a diagram showing a flowchart of a method of aligning a flow cell according to each of the third and fourth embodiments.

A method of aligning flow cell 60 according to the third embodiment will be described with reference to FIG. 11. The method of aligning flow cell 60 according to the present embodiment includes the same steps as those of the method of aligning flow cell 60 according to the first embodiment, but is mainly different therefrom in that a fine adjustment step (S15) is further included between the coarse adjustment step (S10) and the final adjustment step (S20).

In the fine adjustment step (S15), a fine adjustment is performed onto the position of flow cell 60 to allow the second intensity of the second light emitted from the light emitting object to be maximum while continuously moving flow cell 60 at the third speed that is lower than the first speed and that is higher than the second speed. For example, the light emitting object is a fluorescent bead, and the second light includes forward-scattered light 77*f* emitted from the fluorescent bead and fluorescence 77 emitted from the fluorescent bead.

Specifically, controller 130 causes flow cell 60 to be continuously moved at the third speed in the optical axis direction (second direction (x direction)) of imaging element 120 in flow cell 60. Controller 130 performs a fine adjustment onto the position of flow cell 60 in the second direction (x direction) to allow the intensity of forward-scattered light 77*f* emitted from the fluorescent bead to be maximum, the intensity of forward-scattered light 77*f* being detected by second light detector 97. Then, controller 130 causes flow cell 60 to be moved in the third direction (y direction) at the third speed. Controller 130 performs a fine adjustment onto the position of flow cell 60 in the third direction (y direction) to allow the intensity of fluorescence 77 emitted from the fluorescence bead to be maximum, the intensity of fluorescence 77 being detected by first light detectors 96*a* to 96*f*.

The fine adjustment step (S15) is performed after the coarse adjustment step (S10). Therefore, the distance by which flow cell 60 is moved at the third speed in the fine adjustment step (S15) is shorter than the distance by which flow cell 60 is moved at the first speed in the coarse adjustment step (S10).

The final adjustment step (S20) in the present embodiment is similar to the final adjustment step (S20) in the first embodiment, but is mainly different therefrom in the following points. In the present embodiment, the final adjustment step (S20) is performed after the fine adjustment step (S15). The distance by which flow cell 60 is moved at the second speed in the final adjustment step (S20) is shorter than the distance by which flow cell 60 is moved at the third speed in the fine adjustment step (S15). The distance by which flow cell 60 is moved at the second speed in the final adjustment step (S20) of the present embodiment is shorter than the distance by which flow cell 60 is moved at the second speed in the final adjustment step (S20) of the first embodiment.

As required, flow cell 60 may be aligned in the first direction (z direction) also by performing the coarse adjustment step (S10) that is based on the image regarding flow axis 65*p* of flow channel 65 of flow cell 60, the fine adjustment step (S15) that is based on the second intensity of the second light, and the final adjustment step (S20) that is based on the first intensity of the first light.

In the modification of the present embodiment, as with the modification of the first embodiment, the light emitting object is a bead or bubble. Each of the first light and the second light includes forward-scattered light 77*f* and side-scattered light 77*s* emitted from a bead or bubble. In this modification, in each of the fine adjustment step (S15) and the final adjustment step (S20), the position of flow cell 60 in the third direction (y direction) is aligned based on side-scattered light 77*s* emitted from the bead or bubble.

Specifically, in the fine adjustment step (S15) of the modification, controller 130 causes flow cell 60 to be moved at the third speed in the optical axis direction (the second direction (x direction)) of imaging element 120 in flow cell 60. Controller 130 performs a fine adjustment onto the position of flow cell 60 in the second direction (x direction) to allow the intensity of forward-scattered light 77*f* emitted from the bead or bubble to be maximum, the intensity of forward-scattered light 77*f* being detected by second light detector 97. Then, controller 130 causes flow cell 60 to be moved in the third direction (y direction) at the third speed. Controller 130 performs a fine adjustment onto the position of flow cell 60 in the third direction (y direction) to allow the intensity of side-scattered light 77*s* emitted from the bead or bubble to be maximum, the intensity of side-scattered light 77*s* being detected by third light detector 98.

In the final adjustment step (S20) of the modification, controller 130 causes flow cell 60 to be moved at the second speed in the optical axis direction (second direction (x direction)) of imaging element 120 in flow cell 60. Controller 130 performs a final adjustment onto the position of flow cell 60 in the second direction (x direction) to allow the intensity of forward-scattered light 77*f* emitted from the bead or bubble to be maximum, the intensity of forward-scattered light 77*f* being detected by second light detector 97. Then, controller 130 causes flow cell 60 to be moved in the third direction (y direction) at the second speed. Controller 130 performs a final adjustment onto the position of flow cell 60 in the third direction (y direction) to allow the intensity of side-scattered light 77s emitted from the bead or bubble to be maximum, the intensity of side-scattered light 77s being detected by third light detector 98.

Particle sorting apparatus 1c and the method of aligning flow cell 60 according to the present embodiment has the following effects similar to those of particle sorting apparatus 1 and the method of aligning flow cell 60 according to the first embodiment.

In particle sorting apparatus 1c according to the present embodiment, controller 130 further performs a fine adjustment onto the position of flow cell 60 to allow the second intensity of the second light emitted from the light emitting object to be maximum, while controlling moving mechanism 50 to continuously move flow cell 60 at the third speed that is lower than the first speed and that is higher than the second speed, the second intensity of the second light being detected by light intensity detector 99.

In particle sorting apparatus 1c, flow cell 60 is continuously moved at the first speed to perform the coarse adjustment onto flow cell 60, then flow cell 60 is continuously moved at the third speed to perform the fine adjustment onto flow cell 60, and then flow cell 60 is moved at the second speed to perform the final adjustment onto the position of flow cell 60. Thus, the distance by which flow cell 60 is moved at the second speed to perform the final adjustment onto the position of flow cell 60 is further reduced. Particle sorting apparatus 1c can align flow cell 60 in a shorter period of time.

The method of aligning flow cell 60 according to the present embodiment further includes, between the coarse adjustment step (S10) and the final adjustment step (S20), the fine adjustment step (S15) of performing the fine adjustment onto the position of flow cell 60 to allow the second intensity of the second light emitted from the light emitting object to be maximum while continuously moving flow cell 60 at the third speed that is lower than the first speed and that is higher than the second speed.

In the method of aligning flow cell 60 according to the present embodiment, flow cell 60 is moved continuously at the first speed to perform the coarse adjustment onto flow cell 60, then flow cell 60 is moved continuously at the third speed to perform the fine adjustment onto flow cell 60, and then flow cell 60 is moved at the second speed to perform the final adjustment onto the position of flow cell 60. Thus, the distance by which flow cell 60 is moved at the second speed to perform the final adjustment onto the position of flow cell 60 is further reduced. With the method of aligning flow cell 60 according to the present embodiment, flow cell 60 can be aligned in a shorter period of time.

Fourth Embodiment

A particle sorting apparatus 1d according to a fourth embodiment will be described with reference to FIGS. 2, 4 and 7 to 9. Particle sorting apparatus 1d of the present embodiment has a configuration similar to that of particle sorting apparatus 1c of the third embodiment, but is mainly different therefrom in the following points.

Particle sorting apparatus 1d includes imaging element 120b of the second embodiment instead of imaging element 120 of the third embodiment. Imaging element 120b obtains an image regarding flow axis 65p of flow channel 65. The image regarding flow axis 65p of flow channel 65 is, for example, an image of flow channel 65. As with the second embodiment, particle sorting apparatus 1d may further include reflective member 86 and reflective member driving mechanism 87.

A particle sorting method using particle sorting apparatus 1d of the present embodiment is the same as the particle sorting method using particle sorting apparatus 1c of the third embodiment. When sorting the sample particles after flow chamber 10 is aligned, controller 130 controls reflective member driving mechanism 87 to retract reflective member 86 from the optical axis of detection optical system 83. Therefore, the intensity of fluorescence 77 measured by first light detectors 96a to 96f and the intensity of side-scattered light 77s measured by third light detector 98 are prevented from being decreased by reflective member 86.

A method of aligning flow cell 60 according to the fourth embodiment will be described with reference to FIG. 11. The method of aligning flow cell 60 according to the present embodiment includes the same steps as those of the method of aligning flow cell 60 according to the third embodiment, but is mainly different therefrom in the following points.

In the coarse adjustment step (S10) in the method of aligning flow cell 60 according to the present embodiment, the image regarding flow axis 65p of flow channel 65 is an image of flow channel 65 as with the coarse adjustment step (S10) of the method of aligning flow cell 60 according to the second embodiment. It should be noted that the fine adjustment step (S15) of the method of aligning flow cell 60 according to the present embodiment is the same as the fine adjustment step (S15) of the method of aligning flow cell 60 according to the third embodiment.

In the modification of the present embodiment, as with the modification of the third embodiment, the light emitting object is a bead or bubble. Each of the first light and the second light includes forward-scattered light 77f and side-scattered light 77s emitted from the bead or bubble. In this modification, in each of the fine adjustment step (S15) and the final adjustment step (S20), the position of flow cell 60 in the third direction (y direction) is aligned based on side-scattered light 77s emitted from the bead or bubble.

Particle sorting apparatus 1d and the method of aligning flow cell 60 according to the present embodiment has the following effects similar to those of particle sorting apparatus 1c and the method of aligning flow cell 60 according to the third embodiment.

In particle sorting apparatus 1d according to the present embodiment and the method of aligning flow cell 60 according to the present embodiment, the image regarding flow axis 65p of flow channel 65 is the image of flow channel 65. Therefore, flow cell 60 can be aligned in a shorter period of time.

The first to fourth embodiments and modifications thereof disclosed herein should be regarded as being illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 1, 1b, 1c, 1d: particle sorting apparatus; 5: base; 6: wall; 6a, 6b, 6c: opening; 10: flow chamber; 11: chamber; 12: cavity; 16: surface; 20: first tank; 21: first conduit; 22: second tank; 23: second conduit; 30: vibration electrode; 31: vibration electrode portion; 33: end surface; 35: electrically conductive portion; 40: insulation sleeve; 42: sealing member; 44: vibration element; 46: charge supply unit; 48: movable member; 49: fixing member; 50: moving mechanism; 60: flow cell; 61: flow cell body portion; 63: nozzle receiving portion; 65: flow channel; 65p: flow axis; 68:

nozzle; 70: light source unit; 70*a*, 70*b*: laser; 71: laser light; 72: light wavelength combining unit; 77: fluorescence; 77*f*: forward-scattered light; 77*s*: side-scattered light; 81, 121: transparent window member; 83: detection optical system; 84: detection side lens optical system; 86: reflective member; 87: reflective member driving mechanism; 90: optical fiber array; 91*a*, 91*b*: optical fiber; 92: wavelength division unit; 93*a* to 93*e*: dichroic mirror; 94*a* to 94*h*: wavelength filter; 96*a* to 96*f*: first light detector; 97: second light detector; 98: third light detector; 99: light intensity detector; 100: jet flow; 101: break-off point; 104: droplet; 105: particle; 110: sorting unit; 111, 112: deflection electrode; 113: collection unit; 114: sample collection member; 115: waste-liquid collection member; 116: holder; 120, 120*b*: imaging element; 130: controller; 140: storage unit.

The invention claimed is:

1. A particle sorting apparatus comprising:
   a flow cell including a flow channel;
   an imaging element that obtains an image regarding a flow axis of the flow channel;
   a light intensity detector that detects an intensity of light emitted from a light emitting object included in a liquid flowing in the flow channel;
   a moving mechanism that moves the flow cell; and
   a controller that controls the moving mechanism, wherein
   the controller performs a coarse adjustment onto a position of the flow cell based on the image while controlling the moving mechanism to continuously move the flow cell at a first speed,
   the controller performs a final adjustment onto the position of the flow cell to allow a first intensity of first light emitted from the light emitting object to be maximum, while controlling the moving mechanism to move the flow cell at a second speed that is lower than the first speed, the first intensity of the first light being detected by the light intensity detector and,
   the controller performs a fine adjustment onto the position of the flow cell to allow a second intensity of second light emitted from the light emitting object to be maximum, while controlling the moving mechanism to continuously move the flow cell at a third speed that is lower than the first speed and that is higher than the second speed, the second intensity of the second light being detected by the light intensity detector.

2. The particle sorting apparatus according to claim 1, wherein the light emitting object is a fluorescent bead.

3. The particle sorting apparatus according to claim 1, wherein the light emitting object is a bead or bubble including no fluorescent material.

4. The particle sorting apparatus according to claim 1, wherein the image is an image of the liquid flowing out of the flow cell.

5. The particle sorting apparatus according to claim 1, wherein the image is an image of the flow channel.

6. A method of aligning a flow cell, the method comprising:
   performing a coarse adjustment onto a position of the flow cell based on an image regarding a flow axis of a flow channel of the flow cell while continuously moving the flow cell at a first speed; and
   after the performing of the coarse adjustment, performing a final adjustment onto the position of the flow cell to allow a first intensity of first light emitted from a light emitting object included in a liquid flowing in the flow channel to be maximum, while moving the flow cell at a second speed that is lower than the first speed; and
   between the performing of the coarse adjustment and the performing of the final adjustment, performing a fine adjustment onto the position of the flow cell to allow a second intensity of second light emitted from the light emitting object to be maximum, while continuously moving the flow cell at a third speed that is lower than the first speed and that is higher than the second speed.

\* \* \* \* \*